United States Patent
Yan

(10) Patent No.: US 9,871,448 B2
(45) Date of Patent: Jan. 16, 2018

(54) SUPER N-PHASE SWITCHING MODE POWER SUPPLY

(71) Applicant: NVIDIA Corporation, Santa Clara, CA (US)

(72) Inventor: Ming Yan, Shenzhen (CN)

(73) Assignee: NVIDIA CORPORATION, Santa Clara, CA (US)

( * ) Notice: Subject to any disclaimer, the term of this patent is extended or adjusted under 35 U.S.C. 154(b) by 890 days.

(21) Appl. No.: 13/731,764

(22) Filed: Dec. 31, 2012

(65) Prior Publication Data

US 2014/0183951 A1 Jul. 3, 2014

(51) Int. Cl.
| H02J 3/14 | (2006.01) |
| H02M 3/158 | (2006.01) |
| G05F 1/10 | (2006.01) |
| G05F 1/40 | (2006.01) |

(52) U.S. Cl.
CPC ............ *H02M 3/1584* (2013.01); *G05F 1/10* (2013.01); *G05F 1/40* (2013.01); *Y10T 307/406* (2015.04)

(58) Field of Classification Search
CPC ..... G05F 1/10; G05F 1/40; G05F 1/00; G05F 1/46; G06F 1/26
USPC ...... 307/38, 39, 66; 323/237, 241, 271, 272, 323/282, 288; 363/163; 327/427, 103, 327/107; 361/772
See application file for complete search history.

(56) References Cited

U.S. PATENT DOCUMENTS

| 3,614,554 A | 10/1971 | Shield et al. |
| 5,177,431 A | 1/1993 | Smith et al. |
| 5,254,878 A | 10/1993 | Olsen |
| 5,543,773 A | 8/1996 | Evans et al. |
| 5,589,762 A | 12/1996 | Iannuzo |
| 5,847,552 A | 12/1998 | Brown |
| 5,864,225 A | 1/1999 | Bryson |
| 5,905,867 A | 5/1999 | Giorgio |
| 6,014,066 A | 1/2000 | Harberts |
| 6,043,634 A | 3/2000 | Nguyen et al. |
| 6,249,039 B1 | 6/2001 | Harvey et al. |
| 6,310,393 B1 | 10/2001 | Ogura et al. |
| 6,369,557 B1 | 4/2002 | Agiman |
| 6,441,597 B1 | 8/2002 | Lethellier |
| 6,456,049 B2 | 9/2002 | Tsuji |
| 6,462,950 B1 | 10/2002 | Pohjonen |

(Continued)

OTHER PUBLICATIONS

Patrick R. Morrow, Chang-Min Park, Henry W. Koertzen and J. Ted Dibene, II; "Design and Fabrication of On-Chip Coupled Inductors Integrated With Magnetic Material for Voltage Regulators"; IEEE Transactions On Magnetics, vol. 47, No. 6, Jun. 2011; 9 Pages.

(Continued)

*Primary Examiner* — Rexford Barnie
*Assistant Examiner* — Jagdeep Dhillon

(57) ABSTRACT

A power supply system. The power system includes a power supply controller for supplying a control signal. The power system also includes a plurality of MOSFET drivers controlled by the control signal. The power system also includes a plurality of power channels. Each of the power channels includes a plurality of MOSFETs that is controlled by a corresponding MOSFET driver. The plurality of power channels is configured to generate a plurality of power signals, wherein the control signal controls delivery of the plurality of power signals through each of the power channels.

15 Claims, 6 Drawing Sheets

(56) References Cited

U.S. PATENT DOCUMENTS

| | | | |
|---|---|---|---|
| 6,512,285 B1 | 1/2003 | Hashemi et al. | |
| 6,667,603 B2 | 12/2003 | Hiraki et al. | |
| 6,815,938 B2 | 11/2004 | Horimoto | |
| 6,816,978 B1 | 11/2004 | Kaminski et al. | |
| 6,831,448 B2 | 12/2004 | Ishii et al. | |
| 6,850,045 B2 | 2/2005 | Muratov et al. | |
| 6,979,980 B1 | 12/2005 | Hesterman et al. | |
| 6,979,982 B2 | 12/2005 | Herbert | |
| 7,071,660 B2 | 7/2006 | Xu et al. | |
| 7,078,884 B2 | 7/2006 | Miura et al. | |
| 7,122,995 B2 | 10/2006 | Hasegawa et al. | |
| 7,145,383 B2 | 12/2006 | Mizuno et al. | |
| 7,285,941 B2 | 10/2007 | Cha | |
| 7,348,836 B1 | 3/2008 | Velmurugan | |
| 7,441,137 B1 | 10/2008 | Mimberg | |
| 7,492,131 B2 | 2/2009 | Kim | |
| 7,602,166 B1 | 10/2009 | Kang | |
| 7,649,434 B2 | 1/2010 | Xu et al. | |
| 7,795,915 B2 * | 9/2010 | Candage | H02M 3/1584 323/272 |
| 7,849,332 B1 | 12/2010 | Alben et al. | |
| 7,882,369 B1 | 2/2011 | Kelleher et al. | |
| 7,952,460 B2 | 5/2011 | Joehren et al. | |
| 8,525,500 B1 * | 9/2013 | Martin | H02M 3/156 323/283 |
| 8,549,363 B2 | 10/2013 | Cher et al. | |
| 9,092,048 B1 | 7/2015 | Owen | |
| 9,195,246 B2 | 11/2015 | Kahn et al. | |
| 2004/0263212 A1 | 12/2004 | Wald | |
| 2006/0001408 A1 * | 1/2006 | Southwell | H02M 3/1584 323/282 |
| 2006/0055381 A1 * | 3/2006 | Rice | H02M 3/285 323/271 |
| 2006/0055388 A1 * | 3/2006 | Tang | H02M 3/1584 323/284 |
| 2006/0088971 A1 | 4/2006 | Crawford et al. | |
| 2006/0132110 A1 * | 6/2006 | Tang | H02M 3/157 323/282 |
| 2006/0143484 A1 | 6/2006 | Samson et al. | |
| 2006/0152205 A1 * | 7/2006 | Tang | H02M 3/1584 323/284 |
| 2006/0170527 A1 | 8/2006 | Braunisch | |
| 2007/0013350 A1 * | 1/2007 | Tang | H02M 3/1584 323/237 |
| 2007/0165343 A1 | 7/2007 | Barowski et al. | |
| 2007/0186123 A1 | 8/2007 | Winbom | |
| 2008/0075974 A1 | 3/2008 | Fajardo et al. | |
| 2008/0229127 A1 | 9/2008 | Felter et al. | |
| 2008/0244280 A1 | 10/2008 | Hutchison | |
| 2008/0307240 A1 | 12/2008 | Dahan et al. | |
| 2010/0033153 A1 * | 2/2010 | Xing | H02M 3/156 323/288 |
| 2010/0077243 A1 | 3/2010 | Wang et al. | |
| 2010/0265684 A1 | 10/2010 | Minegish | |
| 2011/0108947 A1 | 5/2011 | Guzek et al. | |
| 2011/0156483 A1 * | 6/2011 | Caraghiorghiopol | G06F 1/263 307/66 |
| 2011/0188218 A1 * | 8/2011 | Hsing | H03K 17/687 361/772 |
| 2012/0042176 A1 | 2/2012 | Kim | |
| 2012/0062308 A1 | 3/2012 | Chakrabarty et al. | |
| 2012/0086479 A1 * | 4/2012 | Carpenter | H02M 3/158 327/109 |
| 2012/0313595 A1 * | 12/2012 | Mao | H02M 3/1588 323/271 |
| 2013/0009700 A1 | 1/2013 | Deboy et al. | |
| 2013/0185584 A1 | 4/2013 | Hirairi | |
| 2013/0144447 A1 * | 6/2013 | Simper | H02J 13/0062 700/286 |
| 2013/0257564 A1 | 10/2013 | Huang | |
| 2014/0001639 A1 | 1/2014 | Hiraishi | |
| 2014/0167898 A1 | 6/2014 | Sturcken et al. | |
| 2014/0176116 A1 | 6/2014 | Kumar et al. | |
| 2014/0251669 A1 | 9/2014 | Manusharow | |
| 2014/0264732 A1 | 9/2014 | Elsherbini et al. | |
| 2014/0347025 A1 | 11/2014 | Liao | |
| 2015/0022272 A1 | 1/2015 | Felix et al. | |

OTHER PUBLICATIONS

Sturcken; et al.; "A 2.5D Integrated Voltage Regulator Using Coupled-Magnetic-Core Inductors on Silicon Interposer Delivering 10.8A/mm"; ISSCC 2012/Session23/ Advances in Heterogeneous Integration/23.1; 3 Pages.

Naveen Verma, Analysis Toward Minimization of Total SRAM Energy Over Active and Idle Operating Modes, Journal, Sep. 2011, pp. 1695-1703, vol. 19 Issue No. 9, IEEE, USA. 10 pages.

Kevin Zhang, Faith Amzaoglu, Yih Wang, Low-Power SRAMs in Nanosclae CMOS Technologies, Journal, Jan. 2005, pp. 145-151, vol. 55 Issue No. 1, IEEE. 7 pages.

\* cited by examiner

SUPER N-PHASE SWITCHING MODE POWER SUPPLY

BACKGROUND

A typical multi-phase power supply system is configured to control multiple power channels. More specifically, a power supply controller would be configured to generate multiple control signals or phases. Each of the control signals is assignable and configured to control a corresponding power channel. That is, one control signal would control one power channel. As such, the traditional application of a pure N-phase switching mode power supply controller uses "N" MOSFET drivers to control "N" power channels.

In the traditional switching mode power supply configuration, a multi-phase power controller is designed to generate multiple control signals. Each additional control signal requires additional circuitry used to provide the appropriate control signal for supplying power. For instance, a pulse width modulator (PWM) circuit is required to provide a PWM control signal to manipulate the switching of the control signal.

As power circuits increasingly are tasked to deliver higher power, and to provided increased power control over a broader range of power delivered, this requires additional power channels that are controlled by the same power controller. Under the traditional multi-phase power supply configuration, this would require additional circuitry to generate additional power control signals in order to control the additional power channels.

However, the cost for including additional circuitry, such as PWM circuits, may be too high. For instance, the additional circuitry would require additional space on an integrated circuit when the goal is to reduce the size of the IC chip. Also, additional components included in the added circuitry will have characteristics that are not repeatable from component to component. As such, the control signals generated may be different characteristics, such as, response times. Such differences will detrimentally affect the load currents, or power supplied to the load.

Accordingly, it is desired to have a power controller that is capable of controlling an increased number of power channels without a corresponding increase in the number of components required to generate control signals controlling the power channels.

SUMMARY

A super N-phase power supply system is disclosed. The power system includes a power supply controller for supplying a control signal. The power system also includes a plurality of MOSFET drivers controlled by the control signal. The power system also includes a plurality of power channels. Each of the power channels includes a plurality of MOSFETs that is controlled by a corresponding MOSFET driver. The plurality of power channels is configured to generate a plurality of power signals, wherein the control signal controls delivery of the plurality of power signals through each of the power channels.

In another embodiment, another super N-phase power supply system is disclosed. The power system includes a multi-phase power supply controller for supplying a plurality of control signals. The power system also includes one or more pluralities of MOSFET drivers, such as, a first plurality of MOSFET drivers, a second plurality of MOSFET drivers, etc. Each of the plurality of MOSFET drivers is controlled by a corresponding control signal, such that a control signal controls MOSFET drivers of a corresponding plurality. The power system also includes one or more pluralities of power channels, wherein the pluralities of power channels comprises one or more pluralities of MOSFETs. That is, each plurality of power channels includes a corresponding pluralities of MOSFETs. Further, each plurality of MOSFETs is driven by a corresponding MOSFET driver, and wherein each plurality of power channels generates a corresponding plurality of power signals. As a result, each of the power channels includes a plurality of MOSFETs that is controlled by a corresponding MOSFET driver.

In another embodiment, a method for supplying power through a super N-phase switching mode power supply is disclosed. The method includes providing a control signal from a power supply controller. The method also includes controlling a plurality of MOSFET drivers using the control signal. The method also includes providing a plurality of power channels, wherein each power channel comprises a plurality of MOSFETs. The method also includes controlling a plurality of MOSFETs of a corresponding power channel by a corresponding MOSFET driver. The method also includes generating a plurality of power signals with the plurality of power channels.

BRIEF DESCRIPTION OF THE DRAWINGS

The accompanying drawings, which are incorporated in and form a part of this specification and in which like numerals depict like elements, illustrate embodiments of the present disclosure and, together with the description, serve to explain the principles of the disclosure.

DETAILED DESCRIPTION

Reference will now be made in detail to the various embodiments of the present disclosure, examples of which are illustrated in the accompanying drawings. While described in conjunction with these embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Accordingly, embodiments of the present disclosure provide for super N-phase switching mode power supply controller for generating "N" control signals, wherein a single control signal is configured to control "M" MOSFET drivers and their corresponding power channels.

Figure 1A:
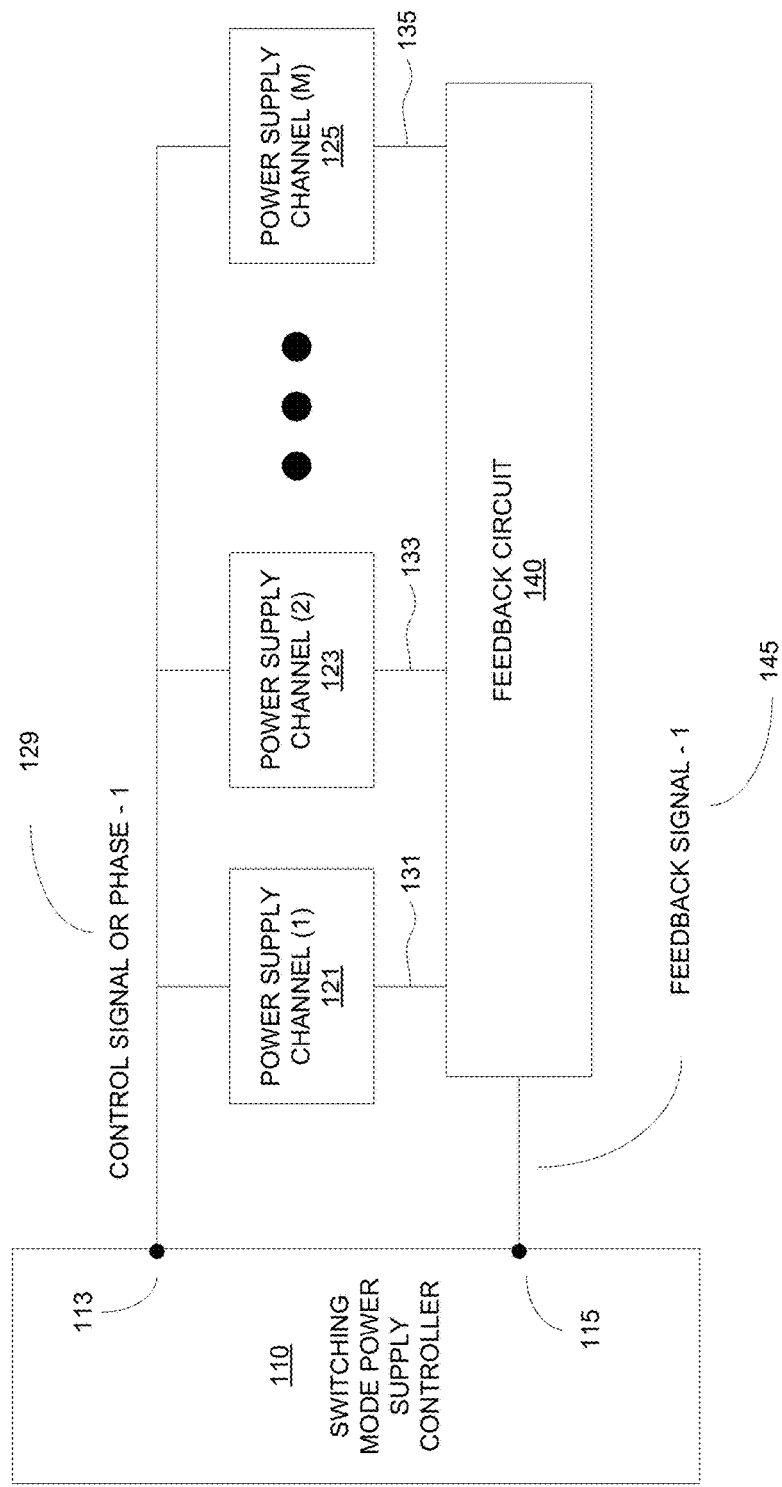
FIG. 1A is a block diagram of a power supply configured to control one or more power channels using a single control signal generated by a switching mode power supply controller, in accordance with one embodiment of the present disclosure.

FIG. 1A is a block diagram of a power supply system 100A configured to control one or more power channels using a single control signal generated by a switching mode power supply controller, in accordance with one embodiment of the present disclosure. In one embodiment, the power supply system 100A is included in an integrated chip (IC), and as such, is configured to control multiple power channels without significantly increasing the overall mapping of the IC since additional circuits for generating additional control signals are not required.

As shown in FIG. 1A, system 100A includes a power supply controller 110. In one embodiment, the controller 110 comprises a switching mode power supply controller. That is, the power supply controller is configured to deliver a switching control signal, such as a PWM control signal in order to regulate the output voltage.

System 100A also includes a plurality of power channels. For instance, the plurality includes M power supply channels (e.g., power supply channel 121, power supply channel 123, on up to the Mth power supply channel 125). Each of the power channels includes a plurality of MOSFETs that collectively provide a power signal at the output of the corresponding power channel. For instance, power supply channel 121 is configured to generate a power signal 131 from a corresponding plurality of MOSFETs, power supply channel 123 is configured to generate a power signal 133 from a corresponding plurality of MOSFETs, and the Mth power supply channel 125 is configured to generate a power signal 135 from corresponding plurality of MOSFETs.

As shown in FIG. 1A, a single control signal 129 provided at the output node 113 of the switching mode power supply controller 110 is used to drive one or more power supply channels. That is, instead of configuring a control signal to drive a corresponding power channel on a singular basis, the control signal is capable of driving M power channels. As shown in FIG. 1A, the power supply 100A is configured such that the control signal 129 is able to control power channels 121, 122, . . . and 125, in one embodiment.

More specifically, the single control signal 129 is coupled to a plurality of MOSFET drivers (not shown). That is, the control signal is routed to the plurality of MOSFET drivers to provide a boosted control signal to plurality of power channels in order to make the MOSFETs in the power channels more responsive. In particular, for each of the power channels 121, 122, . . . and 125, a corresponding MOSFET driver is configured to receive control signal 129 (e.g., phase-1 control signal). In one embodiment, the MOSFET driver is integrated within the corresponding power supply channel. In another embodiment, the MOSFET driver is integrated within the switching mode power supply controller 110.

The MOSFET driver outputs a signal that is used to drive the plurality of MOSFETs in the corresponding power channel. In particular, the MOSFET driver is configured to pre-charge the gate voltage of MOSFETs in the power channel to an appropriate level for each of the plurality of MOSFETs. Specifically, the MOSFET driver charges up the capacitance between the gate and other terminals of a corresponding MOSFET in order to bring the gate voltage up to its operating level (e.g., 10 Volts). This beneficially shortens the turn-on time or switching time of the MOSFETs of a corresponding power channel, or in other words, makes each of the plurality of MOSFETs faster. This in turn makes the power supply more responsive.

In one embodiment, each of the plurality of MOSFET drivers have the same characteristics. For instance, each of the MOSFET drivers have the same duty cycle characteristic. Further, because the MOSFET drivers exhibit the same characteristics, they operate synchronously with the other MOSFET drivers, when controlled by a corresponding control signal. In that manner, when a variable duty cycle PWM control signal is applied simultaneously to a plurality of power channels, because the MOSFET drivers exhibit the same characteristics, the control signal is presented synchronously to each of the plurality of power channels.

In one embodiment, the power supply 100A includes a feedback circuit 140 that is coupled to each of the plurality of power channels 121, 123, . . . 125. The feedback circuit 140 is configured to measure current and voltage information from each of the power supply channels 121, 123, . . . 125. More specifically, the feedback circuit 140 measures current and voltage information from the plurality of power signals outputted from the plurality of power supply channels 121, 123, . . . , 125. For instance, feedback circuit 140 is configured to receive power signal 131 from power supply channel 121, power signal 133 from power supply channel 123, on up to power signal 135 from power supply channel 125.

In one embodiment, feedback circuit 140 is configured to receive and determine current, voltage and power information from each of the power channels 121, 123, . . . 125. Additional information is determined from the current, voltage, and power information obtained from each of the power channels 121, 123, . . . 125. For instance, the current, voltage, and power information is summed or totaled across all of the power channels 121, 123, . . . 125, in one embodiment. In another embodiment, the current, voltage and power information is averaged across all of the power channels 121, 123, . . . 125. The current, voltage, and power information associated with each of the power supply channels, and for the power channels in combination is collected and forwarded in the form of a feedback signal 1145 to the input port 115 of the switching mode power supply controller 110.

In one embodiment, an enable/disable circuit or signal is coupled to each of the plurality of power channels. In particular, the enable/disable functionality provided by the circuit and/or signal activates or deactivates a corresponding power channel. In that manner, the number of power channels controlled by a single control signal is configurable. In one embodiment, the one or more enable/disable circuits is configured to disable all but one of the power channels. In that manner, at least one power channel is active for control by the control signal. In another embodiment, the one or more enable/disable circuits are configurable to disable all of the power channels. In still another embodiment, the one or more enable/disable circuits are configurable to disable some of the plurality of power channels.

Figure 1B:
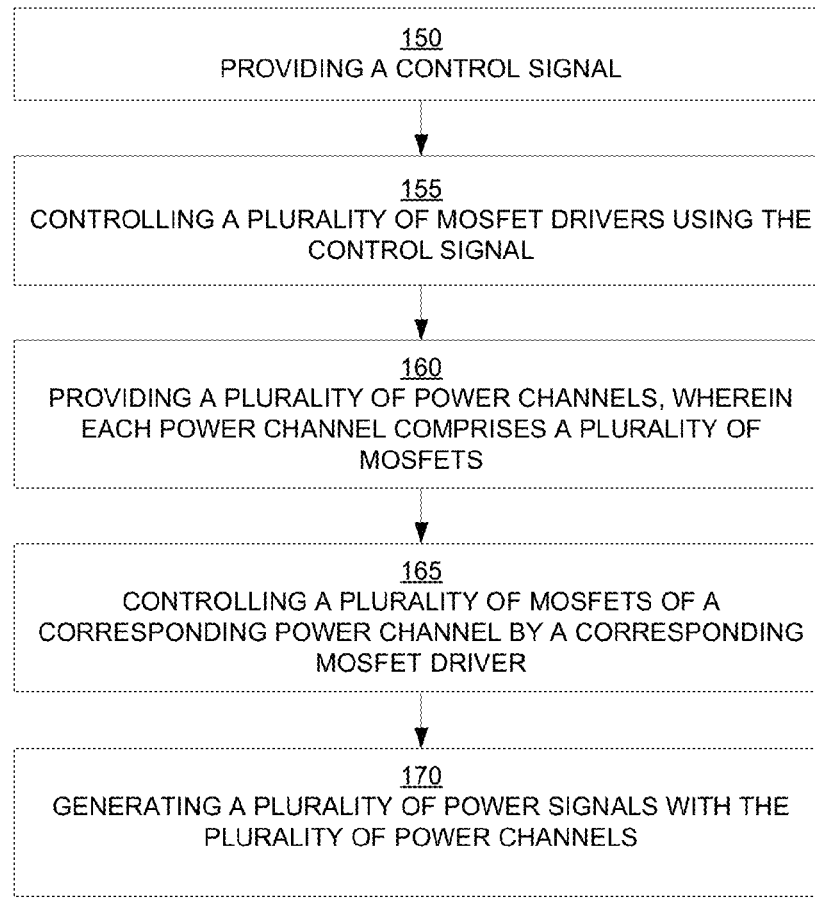
FIG. 1B is a flow diagram illustrating a method for controlling one or more power channels using a single control signal generated by a switching mode power supply controller, in accordance with one embodiment of the present disclosure.

FIG. 1B is a flow diagram 100B illustrating a method for controlling one or more power channels by a switching mode power supply controller, in accordance with one embodiment of the present disclosure. Flow diagram 100B is implemented within the power supply system 100A of FIG. 1A that is configured to control one or more power channels using a single control signal generated by a switching mode power supply controller, in one embodiment.

At 150, the method includes providing a control signal. In addition, the method includes controlling a plurality of MOSFET drivers using the control signal at 155. Specifically, the control signal is configured by a switching mode power supply controller that is configured to deliver a switching control signal, such as, a PWM control signal in order to regulate an output voltage.

At 160, the method includes providing a plurality of power channels, wherein each power channel includes a plurality of MOSFETs, that collectively provide a power signal at the output of the corresponding power channel. More specifically, the single control signal is configured to control each of the plurality of power channels.

At 165, the method includes controlling a plurality of MOSFETs of a corresponding power channel by a corresponding MOSFET driver. That is, the control signal is configured to control the plurality of MOSFETs through a corresponding MOSFET driver. The plurality of MOSFETs of a corresponding power channel provides a power signal that is regulated using a corresponding output inductor and output capacitor coupled to the output inductor.

At 170, the method includes generating a plurality of power signals with the plurality of power channels. Collectively, the plurality of power signals outputted from the plurality of power channels is combined to provide an overall power signal.

The method also includes providing a feedback circuit that measures current and voltage information from the plurality of power signals. As such, the feedback signal conveys various information, including average power delivered by each of the plurality of power channels, and a total power delivered by the plurality of power channels.

Figure 2:
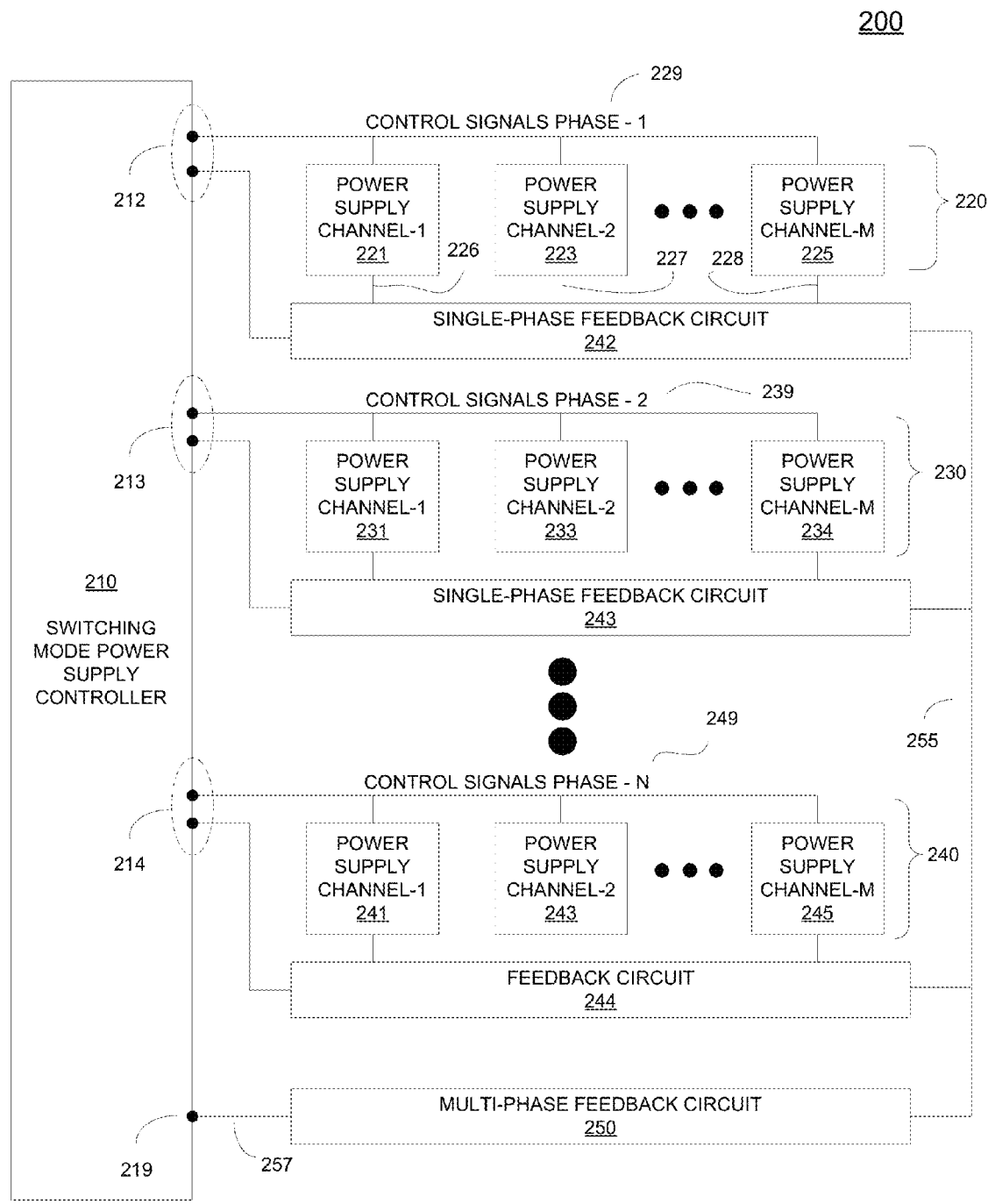
FIG. 2 is a block diagram of a multi-phase power supply including a switching mode power supply controller generating multiple control signals or phases for controlling pluralities of power channels, such that a single control signal is configured to control one or more power channels, in accordance with one embodiment of the present disclosure.

FIG. 2 is a block diagram of a multi-phase power supply 200 configured to control one or more pluralities of power channels using a plurality of control signals generated by a switching mode power supply controller, in accordance with one embodiment of the present disclosure. In one embodiment, the multi-phase power supply 200 includes one or more configurations of the single phase power supply 100A of FIG. 1A, wherein a power supply controller is configured to generate a plurality of control signals, each capable of controlling a plurality of power channels. In one embodiment, the power supply system 200 is included in an IC, and as such, is configured to control multiple pluralities of power channels without significantly increasing the overall mapping of the IC, since additional circuits for generating additional control signals are not required.

As shown in FIG. 2, system 200 includes a power supply controller 210. In one embodiment, the controller 210 comprises a switching mode power supply controller. That is, the power supply controller is configured to deliver one or more switching control signals, such as one or more PWM control signals that are used to regulate the output voltage.

System 200 also includes one or more pluralities of power channels. For instance, system 200 includes a plurality of power channels 220, plurality of power channels 230, on up to plurality of power channels 240. More specifically, each plurality of power channels includes multiple power supply channels. For instance, plurality of power channel 220 includes power channels 221, 223, on up to 225; plurality of power channel 230 includes power channels 231, 232, on up to 235; and the plurality of power channel 240 includes power channels 241, 242, on up to 245. In one embodiment, the pluralities of power channels each contain the same number of power channels. In another embodiment, the pluralities of power channels contain differing numbers of power channels.

Further, each plurality of power channels comprises one or more pluralities of MOSFETs. For instance, a representative plurality of power channels 220 includes M different pluralities of MOSFETs, wherein each plurality of MOSFETs is driven by a corresponding MOSFET driver and is included in a corresponding power channel. As shown in FIG. 1A, the M different pluralities of MOSFETs associated with the plurality of power channels 220 is included in the M power channels 221, 223, on up to 225. Also, one or more pluralities of MOSFETs associated with the plurality of power channels 230 is included in the power channels 231, 233, on up to 235. Also, one or more pluralities of MOSFETs associated with the plurality of power channels 240 is included in the power channels 241, 243, on up to 245.

Collectively, each plurality of power channels is controlled by a single control signal. For example, the control signal 229 provided at the output node in the input/output 212 of the switching mode power supply controller 210 is used to drive one or more power supply channels (e.g., 221, 223, on up to 225) in the plurality of power channels 220. Also, the control signal 239 provided at the output node in the input/output 213 of the switching mode power supply controller 210 is used to drive one or more power supply channels (e.g., 231, 233, on up to 235) in the plurality of power channels 230. Further, the control signal 249 provided at the output node in the input/output 214 of the switching mode power supply controller 210 is used to drive one or more power supply channels (e.g., 241, 243, on up to 245) in the plurality of power channels 240.

Individually, each of the power channels includes a plurality of MOSFETs that collectively provide a power signal at the output of the corresponding power channel. Looking at a representative plurality of power channels 220, power supply channel 221 is configured to generate a power signal 226 from a corresponding plurality of MOSFETs, power supply channel 223 is configured to generate a power signal 227 from a corresponding plurality of MOSFETs, and the Mth power supply channel 225 is configured to generate a power signal 228 from corresponding plurality of MOSFETs. Similarly, the plurality of power channels 230 generates a plurality of power signals, and the plurality of power channels 240 generates a plurality of power signals.

More specifically, the switching mode power supply controller 210 generates multiple control signals or phases used for controlling the pluralities of power channels. As such, a single control signal is configured to control one or more power channels, in accordance with one embodiment of the present disclosure. That is, a single control signal is routed to a plurality of MOSFET drivers (not shown) to provide a boosted control signal that is delivered to a corresponding plurality of power channels in order to make the MOSFETs in the corresponding power channels more responsive. As previously described, a MOSFET driver outputs a signal that is used to drive a corresponding plurality of MOSFETs in a corresponding power channel. For instance, for each of the power channels 221, 223, on up to 225 in the plurality 220, a corresponding MOSFET driver is configured to receive control signal 229 (e.g., phase 1 control signal). Also, for each of the power channels 231, 233, on up to 235 in the plurality 230, a corresponding MOSFET driver is configured to receive control signal 239 (e.g., phase 3 control signal). Further, for each of the power channels 241, 243, on up to 245 in the plurality 240, a corresponding MOSFET driver is configured to receive control signal 249 (e.g., phase 1 control signal). In one embodiment, a corresponding MOSFET driver is integrated within a corresponding power supply channel. In another embodiment, a corresponding MOSFET driver is integrated within the switching mode power supply controller 210.

In one embodiment, each of the plurality of MOSFET drivers have the same characteristics, as previously described. For instance, the MOSFET drivers each show the same duty cycle characteristic. In another embodiment, each of the plurality of MOSFET drivers of a corresponding plurality of power channels exhibit the same characteristic. In that manner, when a variable duty cycle PWM control signal is applied simultaneously to a plurality of power channels (e.g., 220), the control signal is presented synchronously to each of the power channels in the plurality (e.g., 220), since the MOSFET drivers exhibit the same characteristics. In still another embodiment, each of the plurality of MOSFET drivers of each of the pluralities of power channels exhibit the same characteristics.

Furthermore, the super N-phase switching mode power supply is configured to generate "N" control signals, each of which are delivered to "M" MOSFET drivers in a symmetrical power supply, wherein each plurality of power supply channels includes the same number "M" of power channels (other embodiments include different number of channels for each plurality of power supply channels). That is, each of the control signals is delivered to a corresponding plurality of MOSFET drivers that controls a plurality of power channels. As shown in FIG. 2, the "N" control signals include 229, 239, on up to 240, and are delivered to the pluralities of power channels. In the symmetrical power system, each of the "N" control signals is delivered to "M" MOSFET drivers of a corresponding plurality of power supply channels.

For example, in one embodiment a multi-phase power controller generates a first control signal and a second control signal. The first control signal controls a first plurality of MOSFET drivers driving MOSFETs in a first plurality of power channels configured to generate a first plural of power signals. That is, each of the MOSFET drivers in the first plurality controls MOSFETs in a corresponding power channel. Similarly, the second control signal controls a second plurality of MOSFET drivers driving MOSFETs in a second plurality of power channels configured to generate a second plurality of power signals. That is, each of the MOSFET drivers in the second plurality controls MOSFETs in a corresponding power channel.

The power supply 200 also includes a plurality of single phase feedback circuits. The plurality of single phase feedback circuits combined are included in a multi-phase feedback circuit 250. For instance, each of the plurality of power channels is coupled to a corresponding feedback circuit. As shown in FIG. 2, the plurality of power channels 220 is coupled to single phase feedback circuit 242, the plurality of power channels 230 is coupled to a single phase feedback circuit 243, and plurality of power channels 240 is coupled to single phase feedback circuit 244.

Each of the feedback circuits is configured to measure current and voltage information from corresponding power supply channels. As a representative example for a single phase feedback circuit, the feedback circuit 242 measures current and voltage information from the plurality of power signals (e.g., 226, 227, on up to 228) outputted form the plurality of power supply channels 220.

In one embodiment, each of the single phase feedback circuits is configured to receive and determine current, voltage and power information from corresponding power channels. Additional information is also determined from the current, voltage, and power information, such as the sum of all current, voltage, and power across all the power channels in a corresponding plurality of power channels. Also, the average of the all current, voltage, and power information obtained across all the power channels in a corresponding plurality of power channels is determined. As a representative example, single phase feedback circuit 242 is configured to receive and determine current, voltage, and power information from power channels 221, 223, on up to 224. In one instance, the current, voltage, and power information is summed or totaled across the plurality of power channels 220. In another instance, the current, voltage, and power information is averaged across all of the plurality of power channels 220. The current, voltage, and power information associated with power channels taken individually, or in combination, is collected and forwarded in the form of a feedback signal back to the power supply controller 210. For instance, the current, voltage, and power information from the single phase feedback circuit 242 is delivered to input/output 212; current, voltage, and power information from the single phase feedback circuit 243 is delivered to input/output nodes 213; and current, voltage, and power information from the single phase feedback circuit 244 is delivered to input/output nodes 214.

Additionally, the current, voltage, and power information associated with each of the pluralities of power supply channels is forwarded to the multi-phase feedback circuit 250 over path 255. In that manner, the multi-phase feedback circuit 250 is able to provide an averages of the current, voltage, and power supplied by each of the pluralities of power supply channels. In addition, the multi-phase feedback circuit 250 is able to provide a sum or total of the current, voltage, and power supplied by all the pluralities of power supply channels. As such, the multi-phase feedback circuit 250 is configured to generate an output signal 257 providing average or total current, voltage, and power information from the pluralities of power channels back to node 219 of the switching mode power supply controller 210.

Figure 3A:
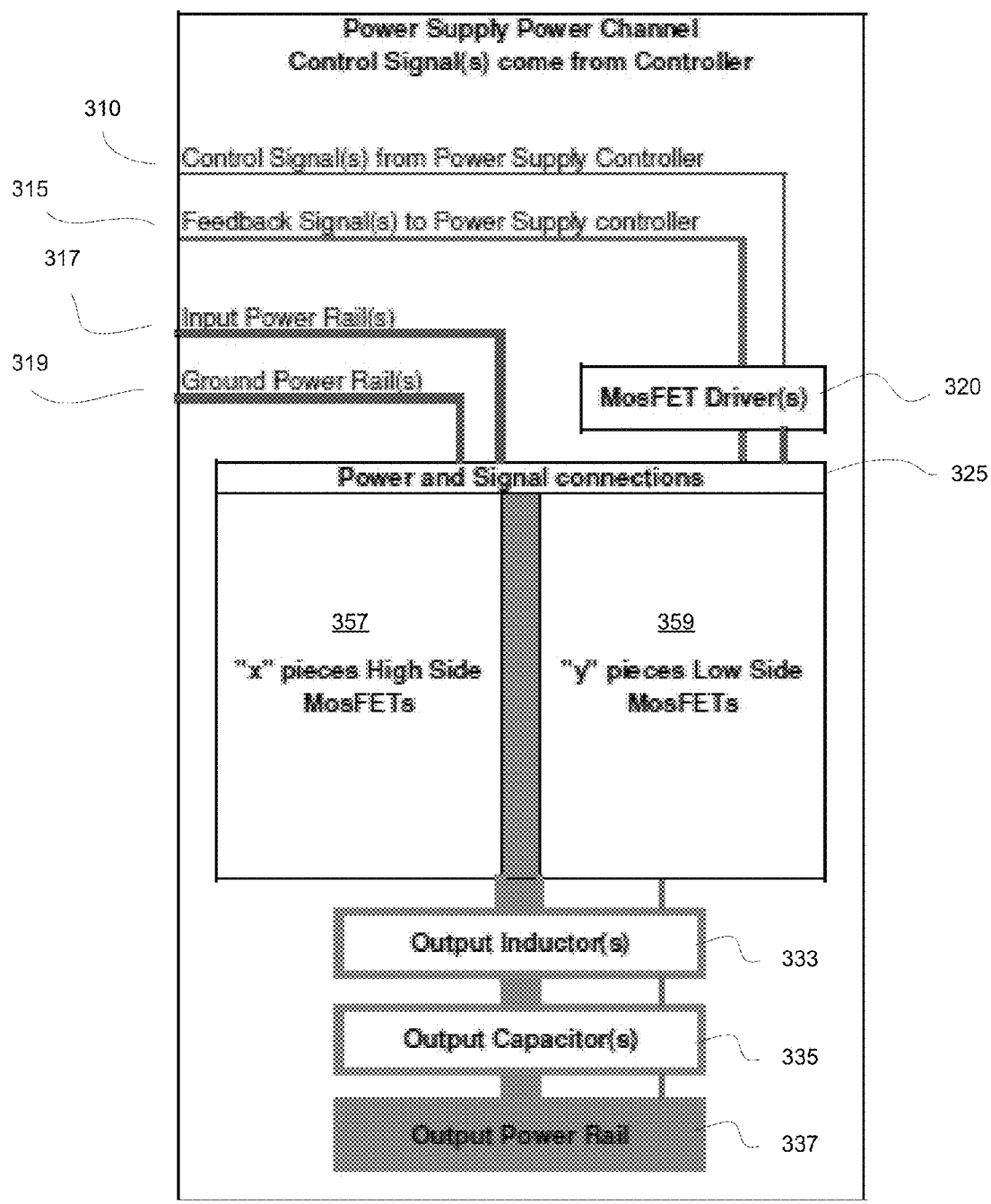
FIG. 3A is a block diagram of a power supply channel including a MOSFET driver configured to control a plurality of MOSFETs for delivering power, wherein the MOSFET driver receives a control signal from a multi-phase power supply controller, in accordance with one embodiment of the present disclosure.

FIG. 3A is a block diagram of a power supply channel 300A including a MOSFET driver configured to control a plurality of MOSFETs for delivering power, wherein the MOSFET driver receives a control signal from a multi-phase power supply controller, in accordance with one embodiment of the present disclosure. More particularly, the one or more MOSFET drivers 320 are integrated within the power supply channel 300A, and receives one or more control signals 310 from the power supply controller.

The one or more MOSFET drivers 320 are coupled to a plurality of MOSFETs. More particularly, the MOSFET drivers 320 is coupled to "x" numbers of high-side MOSFETs 357 through the power and signal connections 325, wherein a representative MOSFET transistor switch is coupled between the high power (e.g., Vdd) and the load. The one or more MOSFET drivers 320 are also coupled to "y" numbers of low-side MOSFETs 359 through the power and signal connections 325, wherein a representative MOSFET transistor switch is coupled between a load and ground, or the negative power (e.g., Vss). In addition, the power and signal connections 325 are coupled to an input power rail 317 and a ground power rail 319. The MOSFET drivers 320 are configured to send the corresponding control signal to the high side MOSFETs independent from delivery to the low side MOSFETs. In that manner, the one or more MOSFET drivers 320 is configured to deliver a boosted control signal 310. Also, the one or more MOSFET drivers 320 is able to deliver a feedback signal, previously described, back to the controller through a corresponding feedback circuit.

The "x" high side MOSFETs 357 and the "y" low side MOSFETs 359 in the power channel 300A are coupled to one or more output inductors 333. The inductors transform low power to high power, and vice versa. The one or more output inductors 333 are coupled to one or more output capacitors 335, which act in part to smooth out the power signal, in order to output a regulated power supply signal to an output power rail 337.

Figure 3B:
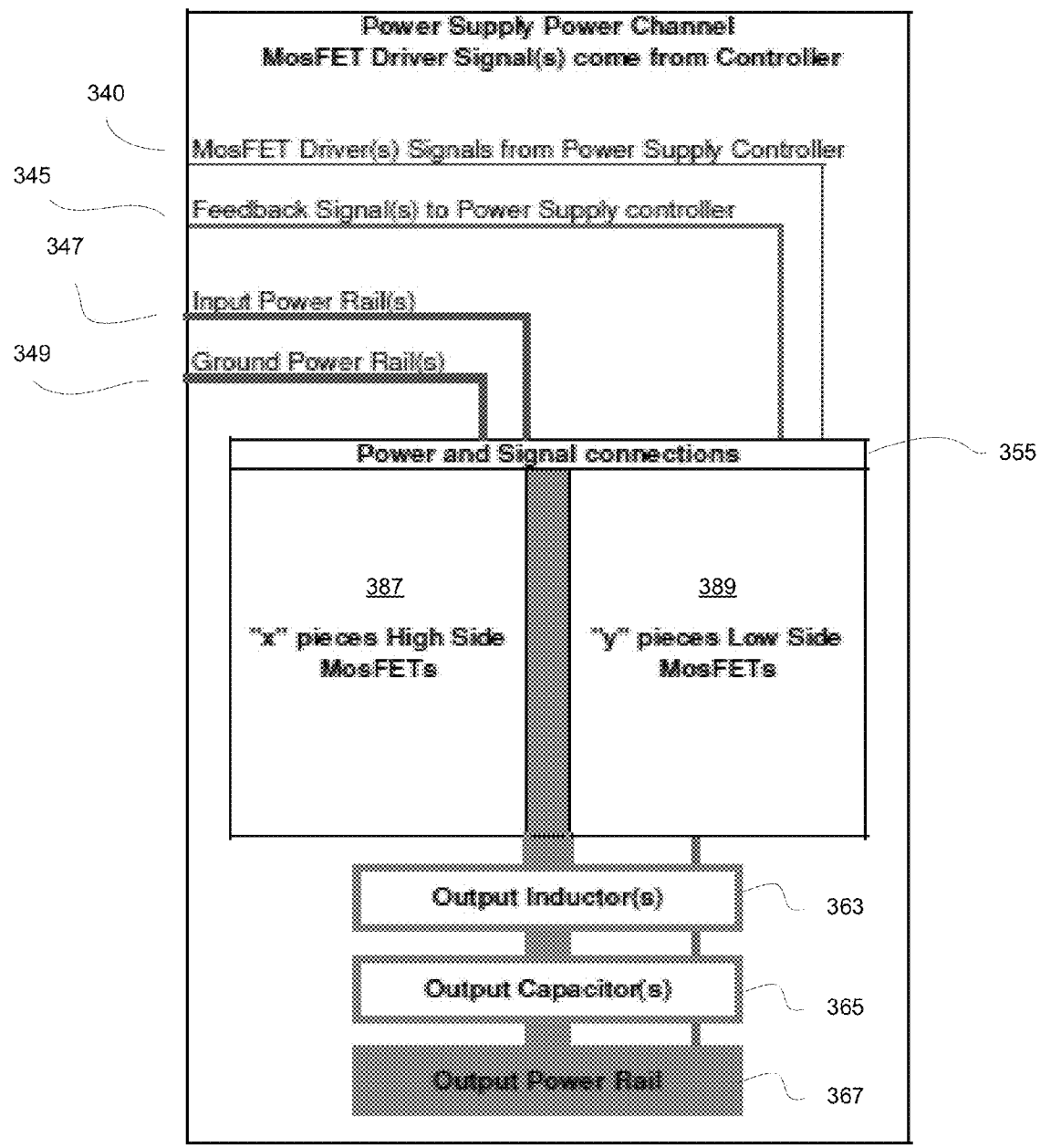
FIG. 3B is a block diagram of a power supply channel receiving a control signal from a MOSFET driver integrated within a multi-phase power supply controller, wherein the control signal from the MOSFET driver control a plurality of MOSFETs in the power supply channel that is configured for delivering power, in accordance with one embodiment of the present disclosure.

FIG. 3B is a block diagram of a power supply channel 300B receiving a control signal 340 from a MOSFET driver integrated within a multi-phase power supply controller, wherein the control signal 340 from the MOSFET driver controls a plurality of MOSFETs in the power supply channel 300B that is configured for delivering power, in accordance with one embodiment of the present disclosure.

More particularly, the one or more MOSFET drivers are integrated within the power supply controller. The MOSFET drivers receives one or more control signals from the power supply controller, and generates boosted control signals 340 that are delivered to the power supply channel 300B. The boosted control signals 340 are delivered to a plurality of MOSFETs. More particularly, the boosted control signals 340 are delivered to "x" numbers of high-side MOSFETs 387 through the power and signal connections 355 through power and signal connections 355. The one or more MOSFET drivers are also coupled to "y" numbers of low-side MOSFETs 389 through the power and signal connections 355. Also, the power and signal connections 355 are coupled to an input power rail 347 and a ground power rail 349. The control signals 340 from the MOSFET drivers integrated in the power controller are configured to send the corresponding control signal to the high side MOSFETs independent from delivery to the low side MOSFETs.

In one embodiment, when using a power controller's integrated MOSFET driver to control the "M" pieces of power channels, an external MOSFET driver is included to control the "X" piece of high side MOSFETs 387 and "Y" pieces of low side MOSFETs 389. When using the power controller's high side MOSFET drive signal to control the "M" pieces of power channels, the duty cycle of the external MOSFET driver is smaller than the duty cycle of the integrated MOSFET driver. When using the power controller's low side MOSFET drive signal to control the "M" pieces of power channels, the duty cycle of the external MOSFET driver is larger than the duty cycle of the integrated MOSFET driver.

Also, the plurality of high side MOSFETs 387 and the plurality of low side MOSFETs 389 are able to deliver a feedback signal 345, previously described, back to the controller through a corresponding feedback circuit.

Further, the "x" high side MOSFETs 387 and the "y" low side MOSFETs 389 in the power channel 300B are coupled to one or more output inductors 363. The inductors transform low power to high power, and vice versa. The one or more output inductors 363 are coupled to one or more output capacitors 365, which act in part to smooth out the power signal, in order to output a regulated power supply signal to an output power rail 367.

Figure 3C:
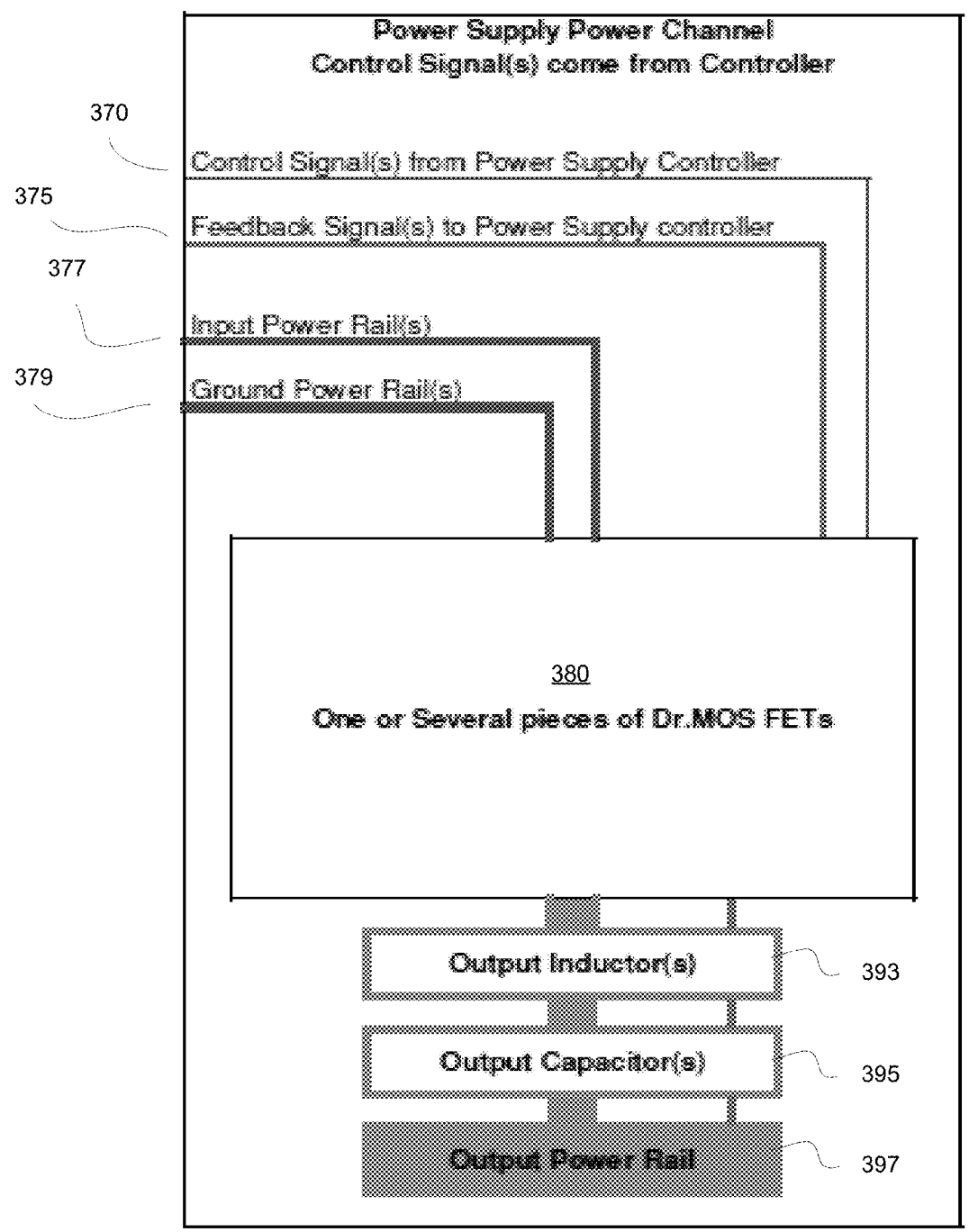
FIG. 3C is a block diagram of a power supply channel receiving a control signal from a multi-phase power supply controller, wherein the power supply channel includes one or more DR.MOSFETs for delivering power, in accordance with one embodiment of the present disclosure.

FIG. 3C is a block diagram of a power supply channel 300C receiving a control signal 370 from a multi-phase power supply controller (not shown), wherein the power supply channel 300C includes one or more DR.MOSFETs for delivering power, in accordance with one embodiment of the present disclosure. In particular, the power channel 300C receives one or more control signals 370 from the multi-phase power supply controller (not shown). The control signals 370 are delivered directly to the one or several pieces of DR.MOSFETs 380. In addition, an input power rail 377 and the ground power rail 379 is coupled to the DR.MOSFETs 380.

The DR.MOSFETs are coupled to the one or more output inductors 393. The inductors transform low power to high power, and vice versa. The one or more output inductors 393 are coupled to one or more output capacitors 395, which act in part to smooth out the power signal, in order to output a regulated power supply signal to an output power rail 397.

Also, the one or more DR.MOSFETs 380 is able to deliver a feedback signal 375, previously described, back to the controller (not shown) through a corresponding feedback circuit.

Thus, according to embodiments of the present disclosure, a super N-phase switching mode power supply is described including a multi-phase power controller configured to control one or more pluralities of power channels using a plurality of control signals, wherein a single control signal is configured to control a plurality of power channels.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

Embodiments according to the present disclosure are thus described. While the present disclosure has been described in particular embodiments, it should be appreciated that the disclosure should not be construed as limited by such embodiments.

The invention claimed is:

1. A power system, comprising:
   a power supply controller for supplying a control signal;
   a plurality of MOSFET drivers controlled by said control signal; and
   a plurality of power supply channels wherein each power supply channel comprises a plurality of MOSFETs and a corresponding MOSFET driver of said plurality of MOSFET drivers and
   wherein said plurality of MOSFETs are controlled by said corresponding MOSFET driver, and wherein said plurality of power supply channels is configured to generate a plurality of power signals,
wherein each of the plurality of MOSFET drivers have a same duty cycle characteristic and
operate synchronously with remaining MOSFET drivers and
wherein said plurality of MOSFETs of each power supply channel comprises:
a high side MOSFET coupled to a positive voltage source and to a load; and
a low side MOSFET coupled to said load and a negative voltage source,
wherein said high side MOSFET and low side MOSFET are configured as a switching mode power supply.

2. The power system of claim 1, wherein each of said plurality of power supply channels further comprises an output circuit comprising:
an output inductor regulating a voltage of a corresponding power signal of said plurality of power signals; and
an output capacitor for providing said corresponding power signal as an output.

3. The power system of claim 1, further comprising:
an enable/disable circuit for enabling or disabling at least one of said plurality of power supply channels.

4. The power system of claim 1, further comprising:
a feedback circuit coupled to each of said plurality of power supply channels,
wherein said feedback circuit measures current and voltage information from said plurality of power signals, and
wherein said feedback circuit provides an average power supplied by each of said plurality of power supply channels and a total power supplied by said plurality of power supply channels.

5. The power system of claim 1, wherein said control signal of said power supply controller comprises a pulse width modified signal.

6. A power system, comprising:
a multi-phase power supply controller for supplying a plurality of control signals;
a plurality of MOSFET drivers,
wherein said plurality of MOSFET drivers are controlled by a corresponding control signal of said plurality of control signals;
a plurality of power channels,
wherein said plurality of power channels comprises a plurality of power supply channels each power supply channel comprising a plurality of MOSFETs and a corresponding MOSFET driver of said plurality of MOSFET drivers wherein said plurality of MOSFETs is driven by said corresponding MOSFET driver, and
wherein each of said plurality of power channels generates a corresponding plurality of power signals,
wherein each of said plurality of MOSFET drivers have a same duty cycle characteristic and operate synchronously with remaining MOSFET drivers and
wherein said plurality of MOSFETs comprises:
a high side MOSFET coupled to a positive voltage source and to a load; and
a low side MOSFET coupled to said load and a negative voltage source,
wherein said high side MOSFET and low side MOSFET are configured as a switching mode power supply.

7. The power system of claim 6, further comprising:
a first control signal supplied by said multi-phase power controller;
a first plurality of MOSFET drivers controlled by said first control signal;
a first plurality of power supply channels each comprising a plurality of MOSFETs and a corresponding MOSFET driver of said first plurality of MOSFET drivers and
wherein said plurality of MOSFETs are controlled by said corresponding MOSFET driver of said first plurality of MOSFET drivers, and
wherein said first plurality of power supply channels is configured to generate a first plurality of power signals;
a second control signal supplied by said multi-phase power controller;
a second plurality of MOSFET drivers controlled by said second control signal; and
a second plurality of power supply channels each comprising a plurality of MOSFETs and a corresponding MOSFET driver of said second plurality of MOSFET drivers and
wherein said plurality of MOSFETs are controlled by said corresponding MOSFET driver of said second plurality of MOSFET drivers for generating a second plurality of power signals.

8. The power system of claim 6, wherein each of said pluralities of power supply channels further comprises an output circuit comprising:
an output inductor regulating a voltage of a corresponding power signal; and
an output capacitor for providing said corresponding power signal as an output.

9. The power system of claim 6, further comprising:
a respective feedback circuit coupled to each of said plurality of power supply channels of each power channel,
wherein said respective feedback circuit measures current and voltage information from a corresponding power channel, and
wherein said respective feedback circuit provides an average power supplied by said corresponding power channel and a total power supplied by said corresponding power channel.

10. A method for supplying power, the method comprising:
providing a control signal;
controlling a plurality of MOSFET drivers using said control signal;
providing a plurality of power supply channels,
wherein each power supply channel comprises a plurality of MOSFETs and a corresponding MOSFET driver of said plurality of MOSFET drivers;
controlling a plurality of MOSFETs of a corresponding power supply channel by a corresponding MOSFET driver of said plurality of MOSFET drivers,
wherein each of said plurality of MOSFET drivers have a same duty cycle characteristic and operate synchronously with remaining MOSFET drivers and
wherein said plurality of MOSFETs of each power supply channel comprises:
a high side MOSFET coupled to a positive voltage source and to a load; and
a low side MOSFET coupled to said load and a negative voltage source, wherein said high side MOSFET and low side MOSFET are configured as a switching mode power supply; and
generating a plurality of power signals from said plurality of power supply channels.

11. The method of claim 10, further comprising:

regulating a voltage of a corresponding power signal using a corresponding output inductor comprised in a corresponding power supply channel;

providing a corresponding power signal through a corresponding output capacitor coupled to said output inductor.

12. The method of claim 10, further comprising:

disabling at least one of said power supply channels leaving at least one power channel active.

13. The method of claim 10, further comprising:

measuring current and voltage information from said plurality of power signals.

14. The method of claim 13, further comprising:

calculating an average power supplied by each of said plurality of power supply channels.

15. The method of claim 13, further comprising:

calculating a total power supplied by said plurality of power supply channels.

* * * * *